July 3, 1951  C. A. WINSLOW ET AL  2,559,267
FILTER
Filed Sept. 16, 1946  2 Sheets-Sheet 1

INVENTORS
CHARLES A. WINSLOW
WILLIAM G. NOSTRAND
LAURENCE L. MOORE
BY
ATTORNEY

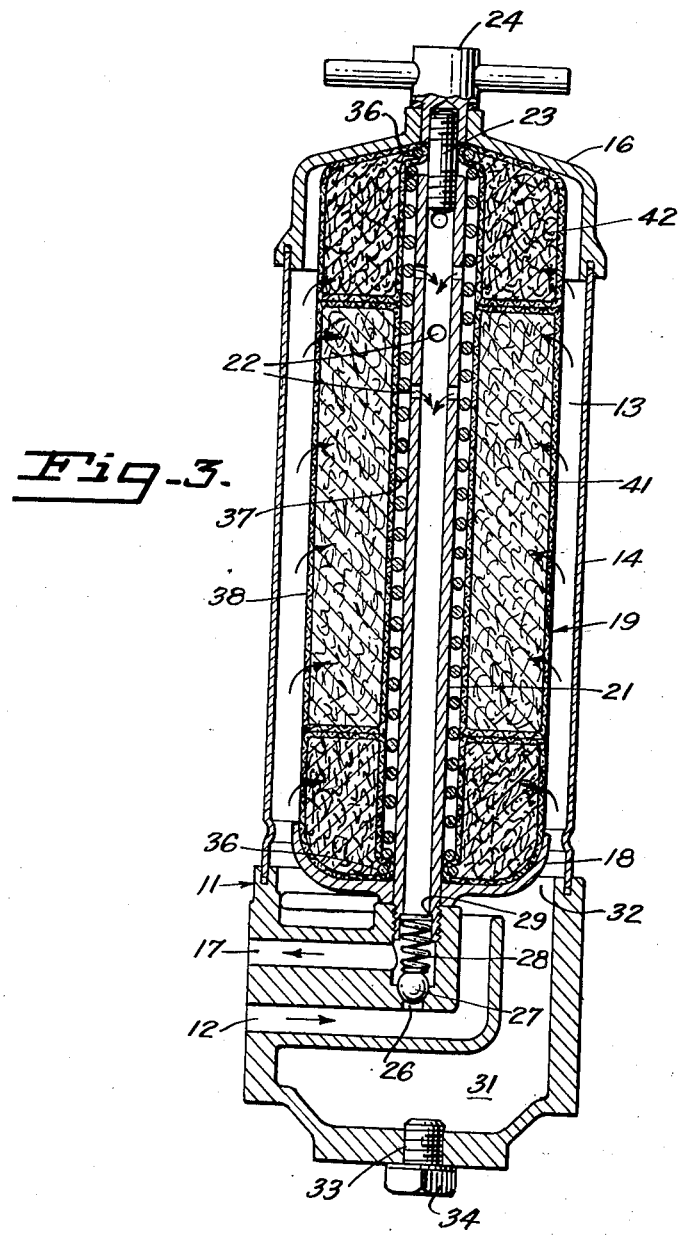

Patented July 3, 1951

2,559,267

UNITED STATES PATENT OFFICE 2,559,267

FILTER

Charles A. Winslow, William G. Nostrand, and Laurence L. Moore, Oakland, Calif., assignors to Winslow Engineering Co., Oakland, Calif., a partnership Application September 16, 1946, Serial No. 697,223

8 Claims. (Cl. 210—183)

This invention relates to filtering units for purifying and conditioning fluids and, more particularly, to filtering units adapted to be employed in a fluid circulation system for purifying and conditioning fluid after it has once served its function in a machine or process so that it can be recirculated for the same purpose. While the principles upon which the invention is based may be advantageously employed in many fields involving such filtration problems, the invention will be illustrated herein by a disclosure of its application to the problem of removing sludge, grit, and other filterable material from lubricating oil and of separating therefrom acid and moisture which are the nuclei of sludge formation.

The particular types of filtering units for lubricating oil to which the invention is especially applicable are those comprising a housing into which oil to be filtered may be continuously introduced through one conduit and from which filtered oil may be continuously removed through another conduit, a suitable filtering material being disposed within the housing in the path of the oil flowing therethrough for removing filterable material from the oil. A form for the filtering material that is frequently employed for use in these types of filtering units is an annulus of substantial length comprising a flexible, hollow casing of porous, knitted fabric, or the like, enclosing a core of mixed fibrous and porous materials. Examples of suitable core materials are spun cotton fibers, wood fibers, and other naturally occurring fibers such as sisal or hemp fibers. In addition, various oil conditioning chemicals that are not soluble in oil and do not react with the chemical compounds used in detergent type oils, may be mixed with the fibrous materials to form a permanent, homogeneous part of the enclosed core. Such filtering elements, however, may be constructed in a variety of shapes adapted to fit into different types of housings and to cooperate with different types of auxiliary apparatus forming the filtering units in which the oil is treated.

Filtering units of the types described above are most commonly connected in the oil circulation system in one of two ways. A constant flow of oil may be shunted from some convenient point in the system in which the oil is flowing under pressure, passed through the filtering unit, and returned to an adjacent or a remote point in the system without the filtering circuit forming any part of the lubricating circuit per se; or the filtering unit may be placed directly in the lubricating circuit in series with the surfaces to be lubricated. In the former instance, only a portion of the total oil circulated passes through the filtering unit, and any interruption or restriction of the flow through the filtering unit in no way hinders the flow of oil to the surfaces to be lubricated. In the latter instance, however, any interruption or restriction of the flow through the filtering unit causes a corresponding reduction in the rate at which the oil is supplied to the surfaces to be lubricated.

Units adapted for use in the second manner described above are generally referred to as "full flow" units. Because these full flow units must at all times be capable of passing oil to the surfaces to be lubricated at the maximum rate required under any set of operating conditions, it is essential that provision be made for by-passing oil around the filtering elements whenever flow through these elements is impeded or interrupted for any reason. If filtering elements are not changed before the accumulation of filtered solid material and sludge clogs its small passageways to an extent substantially reducing the flow therethrough, unfiltered oil must be by-passed around the filtering elements at a sufficient rate to compensate for the reduced capacity of the elements. By-passing oil around the filtering elements is often necessary also when the viscosity of the oil is abnormally high, which condition occurs when an engine or other machine is started cold, and diminishes as the oil is warmed by the normal heat of operation of the machine.

It is obviously desirable that as little unfiltered oil as possible be by-passed around the filtering elements in order to avoid carrying deleterious entrained material to the lubricated surfaces of a machine. The by-passing of unfiltered oil resulting from a failure to change badly clogged filters can be avoided only by changing filtering elements or by cleaning them before this condition occurs. However, this precaution will not prevent the by-passing of unfiltered oil during the warm-up period following cold starting, when the viscosity of the oil may be too great for it to pass through even a new filtering element with the required rate of flow. The by-passing of oil during cold starting can be avoided by increasing the size of the passageways through the filtering material or by increasing the size of the filtering element. However, the first of these expedients is impractical because it raises the minimum size of particles that the filtering element is capable of removing from the oil, and the second expedient is undesirable because it requires enlarging the entire filtering unit to accommodate the larger filtering element with a consequent increase in the cost of the filtering unit and the space it occupies.

Accordingly, the principal object of the present invention is to eliminate, or, at least, substantially reduce the by-passing of unfiltered oil around a filtering element in a full flow unit during cold starting, without raising the minimum size of particles that the filtering element is capable of removing from the oil or increasing the size of the filtering element.

More specifically, it is an object of the invention to provide a filtering unit having two bodies of filtering material arranged in parallel in the fluid path through the unit, one of the filtering bodies being adapted to pass a substantial fraction of the fluid to be filtered while removing therefrom all particles larger than a predetermined size, and the other being adapted to pass the remainder of the fluid to be filtered while removing therefrom all particles down to a substantially smaller size.

A further object of the invention is to provide filtering means adapted to be positioned in a fluid path through a filtering unit so as to pass a substantial portion of the fluid flowing along that path through one filtering portion having a predetermined resistance to fluid flow therethrough and the remainder of the fluid flowing along that path through a second filtering portion having a substantially different resistance to fluid flow therethrough.

A further object of the invention is to provide a unitary filtering element having one portion capable of passing a substantial fraction of the oil flowing through the element while removing therefrom all particles larger than a predetermined minimum size, and another portion capable of passing the remainder of the oil passing through the element while removing therefrom all particles down to a substantially smaller minimum size.

Another important object of the invention is the provision of a filter which will supply filtered oil to the parts to be lubricated even when the lubricating oil flowing through the filter element is cold and is extremely viscous.

A still further object is to provide a filter element in which there are two distinct flow rates for the fluid being filtered, with all the fluid entering a single inlet and leaving a single outlet.

A still further object is to provide means for splitting a stream of fluid under pressure into two separate streams, having different flow rates for filtering and delivering the filtered fluid through a common outlet.

Other objects and advantages of the invention will become apparent from the following description of three preferred embodiments thereof, selected for illustrative purposes and shown in the accompanying drawing, in which:

Fig. 3 is a similar view of a modified form of device.

Figure 1:
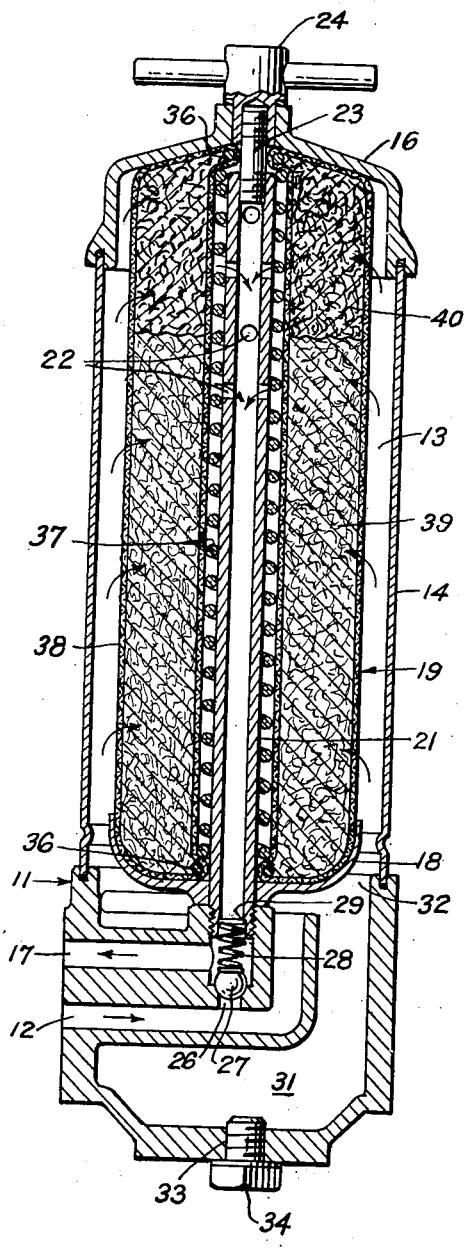
Fig. 1 is a vertical sectional view of a filtering unit containing a unitary filtering element, also shown in section, that is made in accordance with the invention.

Referring now to the drawings in greater detail, the particular filtering units shown therein are specially designed to be employed as full flow units for the lubricating oil systems in small engines and other machines requiring a relatively low but constant flow of oil to various surfaces subject to wear. The unit shown in Fig. 1 comprises a base 11 that defines an inlet passageway 12 for oil to be filtered, the entrance opening to the passageway being adapted to be connected in any desired manner to a conduit (not shown) for supplying oil to the inlet passageway. This passageway 12 extends partially across the base 11 and then upwardly to near the top of the base, where it is suitably expanded to conduct unfiltered oil into a chamber 13 entirely around the bottom portion thereof. The chamber 13 may be defined by a cylindrical shell 14 having its lower end seated against and closed by the base 11 and its upper end seated against and closed by a removable cap 16.

The base 11 also defines an outlet passageway 17 for filtered oil, which passageway extends downwardly through the center of the base to a point directly above the inlet passageway 12, where it turns and extends laterally through the base to an exit opening adapted to be connected in any desired manner to a conduit (not shown) for carrying filtered oil to surfaces to be lubricated. Around the upper end of the outlet passageway 17, an outwardly and upwardly flared cup 18 is provided for supporting an elongated, annular, filtering element 19, described in more detail hereinafter.

A vertically disposed tube 21, having its lower end extending through the cup 18 and into threaded engagement with the outlet passageway 17, projects upwardly into the central opening of the annular filtering element 19 and terminates just below the upper end thereof. Numerous perforations 22 are provided in the walls of the tube 21 at spaced points along substantially the entire length of the filtering element 19, and circumferentially around the tube, for admitting into the tube filtered oil that has passed radially inwardly through the filtering element. The upper end of the tube 21 is closed by a rod or plug 23 that is threaded into the tube. The upwardly extending end of the plug 23 is also threaded, and a cap retaining element 24, adapted to bear downwardly upon the cap 16, is internally threaded for receiving the threaded upper end of the plug 23 and forcing the cap tightly against the upper end of the shell 14.

Filtered oil passing through the perforations 22 and into the tube 21, flows down the tube and out of the filtering unit through the outlet passageway 17. Because the filtering element 19 may become incapable of handling the required flow of oil, as when filtering elements are not changed at proper intervals, a passageway 26 is provided between the inlet and outlet passageways 12 and 17 for by-passing oil from the inlet passageway directly into the outlet passageway. The by-pass passageway 26 is normally closed by a ball 27 held against a suitable seat in the passageway by one end of a helical spring 28. The lower end of the tube 21 is internally rabbeted at 29 to provide a seat for the opposite end of the helical spring. When the resistance of the filtering element 19 to the flow of oil therethrough rises above a critical value determined by the strength of the spring 28, the pressure in the inlet passageway 12 causes the ball 27 to move upwardly, allowing unfiltered oil to flow into the outlet passageway 17 at a rate sufficient to maintain the required total flow of oil through the unit.

A sump 31 is preferably formed in the bottom of the base 11 with an opening 32 leading thereto from the chamber 13. The opening 32 preferably extends entirely around the bottom of the chamber 13, except where it must be interrupted by the partitions defining the inlet and outlet passageways 12 and 17, so that particles of heavy foreign matter settling out of the unfiltered oil in the chamber 13 may accumulate in the sump. A drain opening 33 for the sump 31 is formed in the bottom thereof and is closed by a removable plug 34, whereby the entire filtering unit may readily be flushed out and drained when the filtering element is removed for replacement.

The filtering element 19 is of the type disclosed in U. S. Patent No. 2,314,640 (Figs. 1 to 5 inclusive and 10) and may comprise an annular core of fibrous material having two layers of pervious, knitted, sheathing material covering the inner, outer, and end surfaces thereof; a pair of small, helical springs 36 embedded in each end of the element with the ends of each spring joined together to contract the ends of the filtering element snugly around the tube 21; and a large helical spring 37 extending through the central opening in the element and surrounding the tube 21 for spacing the inner surface of the element from the tube. The sheathing material 38 for the filtering element is indicated schematically in the accompanying drawings for simplicity by showing only a single thickness surrounding the core of the filtering element. Instead of being filled with a mixture of fibrous materials of the same character throughout the volume enclosed thereby, the sheathing material 38 is partially filled with a mixture 39 of fibrous material of a relatively fine texture, tightly packed, and the remaining volume is filled with another mixture 40 of coarser material, also tightly packed. By a proper selection of materials forming the core of the filtering element, the lower portion of the core may comprise a mass or body of filtering material that will permit oil to filter therethrough at a rate somewhat below the average rate for the entire element, and the upper portion of the core may comprise a mass or body of filtering material that will permit oil to filter therethrough at a rate somewhat above the average rate for the entire element. The less pervious material 39 may be selected for removing from the oil flowing therethrough all entrained particles of deleterious material larger than a predetermined size that may safely be allowed to remain in the oil; but, because of the relatively slow rate of flow of oil through a material sufficiently dense to accomplish this result, it is desirable to sacrifice complete removal of particles of small size by providing a second filtering portion composed of coarser fibrous material 40 that will permit a higher rate of oil flow while passing some particles larger than the predetermined maximum safe size.

During the warm-up period following cold starting of an engine or other machine, the oil is generally abnormally viscous, and its rate of flow through the finer filtering material 39 is materially reduced. Unless the total flow through filtering element 19 is augmented in some manner when such conditions exist, any deficiency in the flow of oil through a single mass of material such as 39 would have to be compensated for by passing totally unfiltered oil through the by-pass passageway 26, thereby carrying a large concentration of deleterious material comprising large, as well as small, particles to the surfaces to be lubricated, with consequent excessive wear of those surfaces inevitably resulting. By packing one end of the filtering element with the material 40 having a lower resistance to fluid flow than the material 39, this effect of the increased viscosity of the oil is reduced, and the occasions when unfiltered oil must by-pass the filtering element 19 occur less frequently, or not at all. While this expedient permits the passage of some relatively small deleterious particles through the material 40 at all times during normal operation, none of the larger foreign particles will pass therethrough. Since the major portion of the oil normally flows through the larger body of fine material 39, repeated circulation of oil through the oil circuit causes substantially all particles of foreign matter larger than the maximum safe size eventually to be removed from the oil by the filtering element 19.

Figure 2:
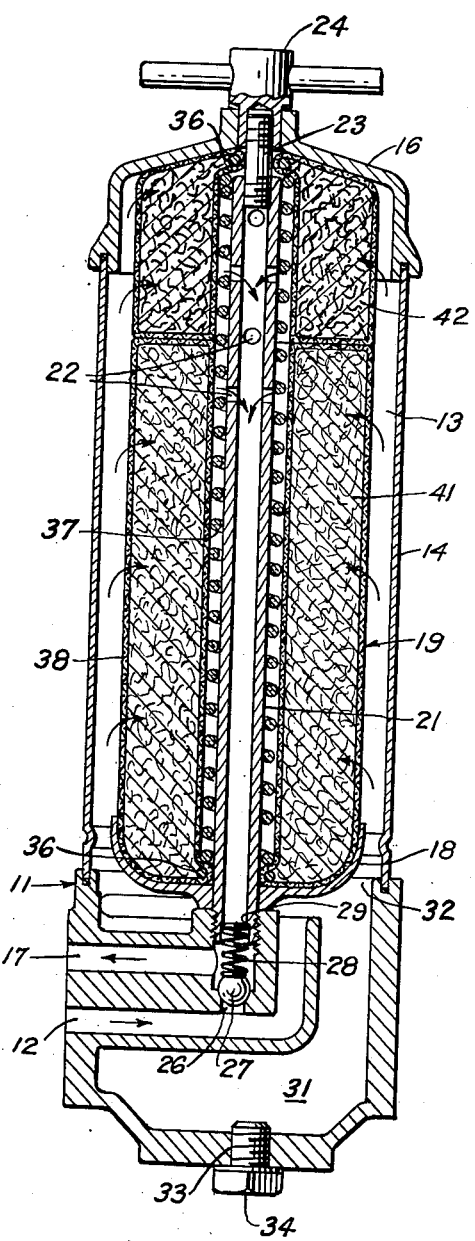
Fig. 2 is a vertical sectional view of a modified form of filtering unit containing a pair of filtering elements, also shown in section, arranged in parallel in the path of fluid flowing through the unit and adapted to operate in accordance with the invention.

In Fig. 2, a modified arrangement is illustrated in which a plurality of filtering elements 41 and 42 are employed instead of the single element 19 shown in Fig. 1. With such an arrangement, the larger filtering element 41 is entirely filled with the fine filtering material 39 employed in the lower portion of the filtering element 19, and the smaller filtering element 42 is entirely filled with the coarse filtering material 40 employed in the upper portion of the filtering element 19. The two filtering elements 41 and 42 are held in tight end-to-end engagement by pressure exerted when the cap 16 is forced into place, so that unfiltered oil cannot flow therebetween. In other respects, the construction of the filtering elements 41 and 42 is like that of the filtering element 19 and like that of the filtering elements disclosed in the above mentioned patent. Except for the differences in the arrangement of filtering material in the units shown in Figs. 1 and 2, these units are identical, and the unit shown in Fig. 2 need not be further described.

An advantage of having the high flow section at the top comes particularly in intermittent operations or in operations in cold climates and effects a maximum filtering of the oil stream at the earliest practical moment. When the oil is cold and highly viscous little if any will flow through the usual filtering element until the oil is warmed up. Instead, it will mostly by-pass through the port 26. This means that considerable time will elapse before the oil up around the filter element will become warm, and as a consequence, if the filter elements were of low flow rate, filtering would not begin for some time. By having the high flow rate section 42 at the top upward movement of oil occurs in the whole filter housing when oil flows through the element 42. This draws warmed oil up around the element 41 and soon the oil in that element is warmed sufficiently to allow the oil to pass through it too. Thus less oil has to be by-passed around the filter elements.

In Fig. 3, the filter is of the general type of construction of the Fig. 2 device, except that there are high flow filter elements 42 at both ends of the filter element 41. Thus at all times some of the oil is passing through the coarse filter material 40, and by-passing is reduced to the minimum even for very cold weather or a very viscous oil. At the same time the elements 42 are made sufficiently small, so that as the fluid becomes warmer, most of it will filter through the fine filtering material 39.

From the foregoing description of three preferred embodiments of the present invention, it will be appreciated that a filtering unit and filtering means therefor have been provided that cooperate in a novel manner to accomplish the several objects recited in the introductory portion of this specification. While the invention has been illustrated by reference to certain specific filtration problems and certain specific physical devices for overcoming those problems, it will be apparent to those skilled in the art to which the invention pertains that the type of filtration problems described are not peculiar alone to the filtration of lubricating oil for engines and other machines. The general principles employed in the illustrated embodiments of the invention will be found to be applicable to other types of filtration problems, and various modifications of the structural details disclosed herein can obviously be made without departing from the true spirit and scope of the invention as defined in the appended claims.

We claim:

1. A filtering unit comprising means for conducting liquid to be filtered through a filtering medium, and a plurality of masses of pervious filtering material arranged in parallel in the path of said liquid between a common inlet and a common outlet, said masses differing in their resistance to liquid flow therethrough, the less resistant and coarser filtering mass being above the more resistant and finer filtering mass, whereby cold oil will tend to pass through said less resistant mass and after the oil has become warm and less viscous it will tend to pass mostly through said finer filtering mass.

2. A filtering unit for a lubricated engine comprising a housing having a single inlet opening and a single outlet opening for the material being filtered, a by-pass in one end of said housing, a filtering means in said housing having a portion thereof less resistant to the flow of said material than the remainder thereof, said less resistant section being remote from said by-pass, whereby when said engine is started cold said material will flow past the more resistant section on its way to the less resistant section, said filtering means sections being disposed in parallel in said housing for parallel flow of said material therethrough.

3. A filtering unit comprising a housing having a common inlet means and a common outlet means, two filtering elements containing relatively coarse filtering material, one of said elements being at each end of said housing and a third filtering element containing relatively fine filtering material between said two end elements, whereby some of the liquid is filtered through one of said elements, some through another said element, and the rest through the remaining element and then all of said liquid is passed into said common outlet.

4. A filtering unit comprising a housing having an inlet and an outlet with a path for liquid flow therebetween and a plurality of pervious filtering elements of different flow rates disposed in said path in parallel between the said inlet and the said outlet.

5. In a filter having a single inlet and a single outlet, the combination therewith of a pervious multi-section filtering element, each secting being composed of compacted fibers and at least one section differing from the rest of said element by having a liquid flow rate different therefrom due to a difference in perviousness, whereby some of said liquid flows only through one section at its flow rate while other portions of said liquid flow through the remaining sections at a different flow rate, and all of said liquid flows out through the single outlet.

6. In a filter having a single inlet and a single outlet, the combination therewith of a multi-section pervious filtering element, at least one of said sections differing in perviousness and so in liquid flow rate from other of said sections whereby part of the liquid flows only through said section at its flow rate while the rest of said liquid flows only through the remainder of said element at a different flow rate and then all of the liquid flows out through the single outlet.

7. A liquid filter comprising a hollow casing having an inlet and an outlet and a pervious filtering element within said casing having a high-flow-rate pervious section and a low-flow-rate pervious section in parallel with said high-flow-rate section and delivering all the filtered liquid to said common outlet.

8. A filtering element comprising a single cartridge having a pervious body adapted to absorb liquid and an opposite surface adapted to discharge said liquid, and a plurality of masses of filtering material in parallel in said cartridge, each mass filling a section between said two surfaces for substantially parallel liquid flow therethrough and differing from its adjacent mass in having a different flow rate therethrough.

CHARLES A. WINSLOW.
WILLIAM G. NOSTRAND.
LAURENCE L. MOORE.

REFERENCES CITED

The following references are of record in the file of this patent:

UNITED STATES PATENTS

| Number | Name | Date |
| --- | --- | --- |
| 1,906,417 | Renfrew et al. | May 2, 1933 |
| 2,014,800 | Deguenther | Sept. 17, 1935 |
| 2,017,232 | Brown | Oct. 15, 1935 |
| 2,031,589 | Burkhalter et al. | Feb. 25, 1936 |
| 2,076,935 | Burkhalter | Apr. 13, 1937 |
| 2,098,102 | McLean | Nov. 2, 1937 |
| 2,098,725 | Hurn | Nov. 9, 1937 |
| 2,143,044 | Wicks et al. | Jan. 10, 1939 |
| 2,148,708 | Orr | Feb. 28, 1939 |
| 2,201,418 | Williams et al. | May 21, 1940 |
| 2,233,093 | Carman et al. | Feb. 25, 1941 |
| 2,253,684 | Burkhalter | Aug. 26, 1941 |
| 2,253,686 | Burkhalter | Aug. 26, 1941 |
| 2,271,054 | Williams | Jan. 27, 1942 |
| 2,304,618 | Williams | Dec. 8, 1942 |
| 2,311,320 | Williams | Feb. 16, 1943 |
| 2,325,657 | Burkness | Aug. 3, 1943 |
| 2,328,131 | Eisler | Aug. 31, 1943 |
| 2,362,530 | Bennett | Nov. 14, 1944 |
| 2,422,647 | Vokes | June 17, 1947 |
| 2,447,680 | Bauer | Aug. 24, 1948 |

FOREIGN PATENTS

| Number | Country | Date |
| --- | --- | --- |
| 118,713 | Australia | July 17, 1944 |